United States Patent [19]
Nydam et al.

[11] 3,768,673
[45] Oct. 30, 1973

[54] EXTENDABLE AND TILTABLE LOAD-TRANSFER PLATFORM

[76] Inventors: Bernard Nydam, 4004 Ivanrest; Ralph Voetberg, 3218 Ivanrest, both of Grandville, Mich.

[22] Filed: Jan. 31, 1972

[21] Appl. No.: 221,969

[52] U.S. Cl............... 214/83.24, 214/85, 296/26, 214/515
[51] Int. Cl............................................. B60p 1/00
[58] Field of Search............... 214/83.24, 83.26, 214/85, 85.1, 515, 517; 296/26; 280/34

[56] References Cited
UNITED STATES PATENTS

| | | | |
|---|---|---|---|
| 2,094,401 | 9/1937 | Girl | 214/83.24 X |
| 3,167,193 | 1/1965 | Klosk | 214/83.26 |
| 2,223,275 | 11/1940 | Valenzuela | 296/35 A X |
| 2,892,556 | 6/1959 | Lowe | 214/83.24 |
| 3,084,816 | 4/1963 | Bozio | 214/83.24 |
| 3,028,025 | 4/1962 | White | 214/83.24 X |
| 2,327,680 | 8/1943 | Tavaris | 214/83.24 |
| 3,687,314 | 8/1972 | Haugland | 214/83.24 |

*Primary Examiner*—Albert J. Makay
*Attorney*—Glenn B. Morse

[57] ABSTRACT

A load-carrying platform is roller-mounted on rails normally secured to the floor of a truck, and is arranged to move from a forward position over the floor of the truck to a rearwardly-extended position overhanging the rear end of the truck. At the rearward extreme of this movement, the rails release the platform for tilting on the truck to form an inclined loading ramp.

2 Claims, 17 Drawing Figures

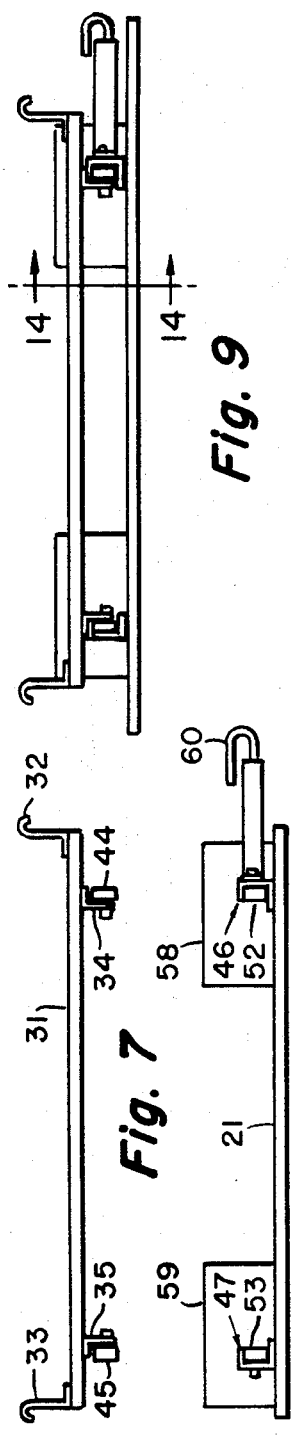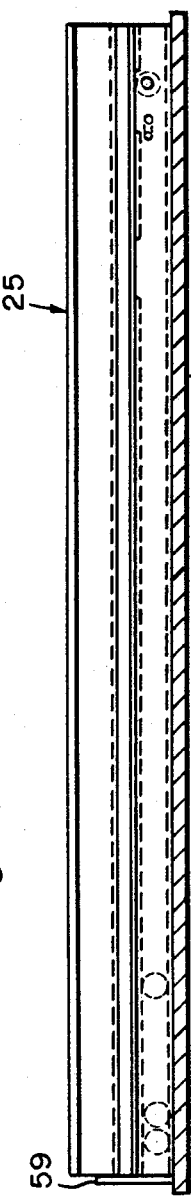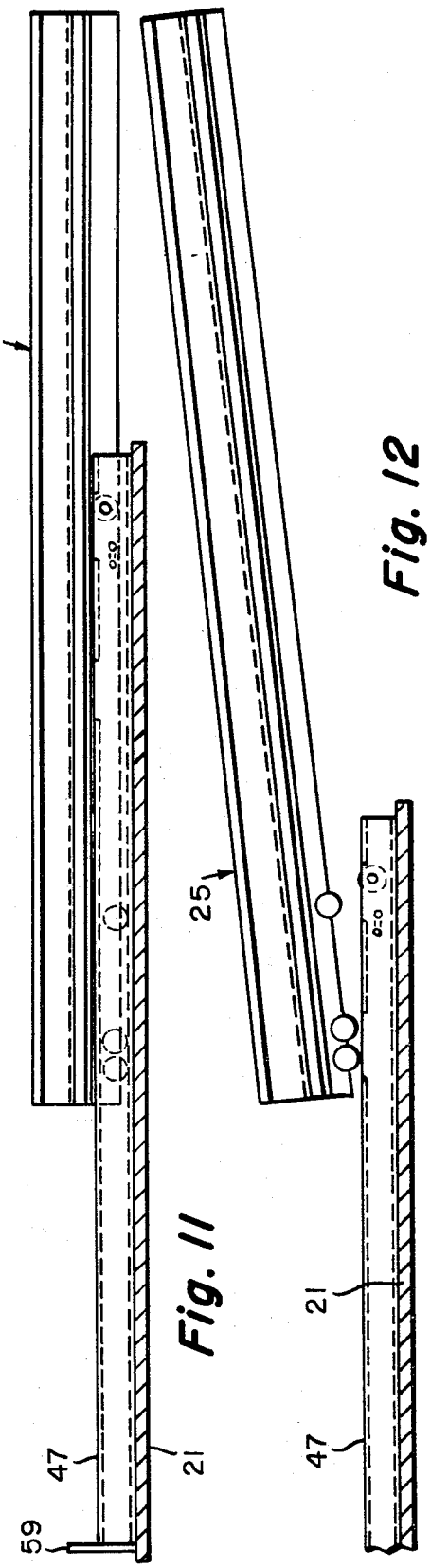

EXTENDABLE AND TILTABLE LOAD-TRANSFER PLATFORM

BACKGROUND OF THE INVENTION

A number of systems have been developed for facilitating the placement and removal of freight articles on and from the load floor of a truck. The full utilization of the space above the load floor usually requires a considerable amount of shifting of the articles from the rear to the front after they have been placed on the rear portion of the truck floor, either from ground level, or from a loading dock. Accessability of particular freight articles within a large pile usually requires that enough space remain clear for the workman to move around and perform what amounts to a sorting operation. All of this space is, of course, wasted for purposes of carrying load. One approach to this problem has been to assure a fairly free movement of articles in a front-to-rear direction through the use of roller-supported panels upon which freight articles are placed. Standard roller conveyors have been mounted on the floor of trucks for this purpose, with the load items being placed directly on large sheets of plywood. More sophisticated versions of this same general principle involve the use of load carriers supported on rollers engaging rails secured to the truck floor. Systems of this nature are analogous to the drawer-suspension mechanism frequently found in filing cabinets. One problem associated with this type of device is the fact that rearwardly-extended positions of the platform result necessarily in a cantilever support of the load, which places a tremendous stress requirement on the portion of the structure which still remains engaged with the rails. When mechanism of this type is used in conjunction with a truck, a special problem exists in the fact that a loading dock will usually not be in alignment with the load carrier in the rearwardly-extended position, thus resulting in the need for some sort of auxiliary support for the extended portion of the structure, unless unduly heavy and expensive components are used which will sustain the cantilever supporting position.

SUMMARY OF THE INVENTION

The present invention provides a roll-out load-transfer platform for installation on a truck, in which the platform is released at the rearward extremity of its movement to assume an inclination either upward (to accomodate a high loading dock), or downwardly to form an inclined-loading ramp. In the latter position, the system is constructed such that the rearward portion of the truck can function as a fulcrum. A latch device is provided which will prevent the load-carrying platform from moving to the escape position until such movement is desired. The standard tailgate of a truck is also utilized as a means of blocking the rearward movement of the roller-mounted platform. The use of the tilting loading ramp, which is capable of rolling forward into a position over the floor of the truck, removes the usual problem associated with loading ramps at the intersection of the inclined ramp and the horizontal floor surface. Freight articles, particularly those that have to be moved on rollers, have a tendency to "hang up" at this intersection. When the load can be worked up into position on the inclined ramp, which is then tilted bodily to a horizontal position for movement over the floor of the truck, this entire problem is eliminated. The ramp also functions as a lifting lever in this operation.

DESCRIPTION OF THE DRAWINGS

FIG. 7 is an end view on a reduced scale of the platform assembly shown in FIG. 4.

FIG. 8 is a rear end view, on a similarly reduced scale, showing the structure of FIG. 6.

FIG. 9 is an end view showing the platform assembly interengaged with the rails.

FIG. 10 is a section in side elevation showing the platform assembly in a position corresponding to FIG. 3.

FIG. 11 is a view of the structure shown in FIG. 10, in an intermediate rearwardly-extended position.

FIG. 12 is a view of the structure shown in FIGS. 10 and 11, in the rearward release position permitting an incline of the load-transfer platform in either direction.

DESCRIPTION OF THE PREFERRED EMBODIMENT

Figure 1:
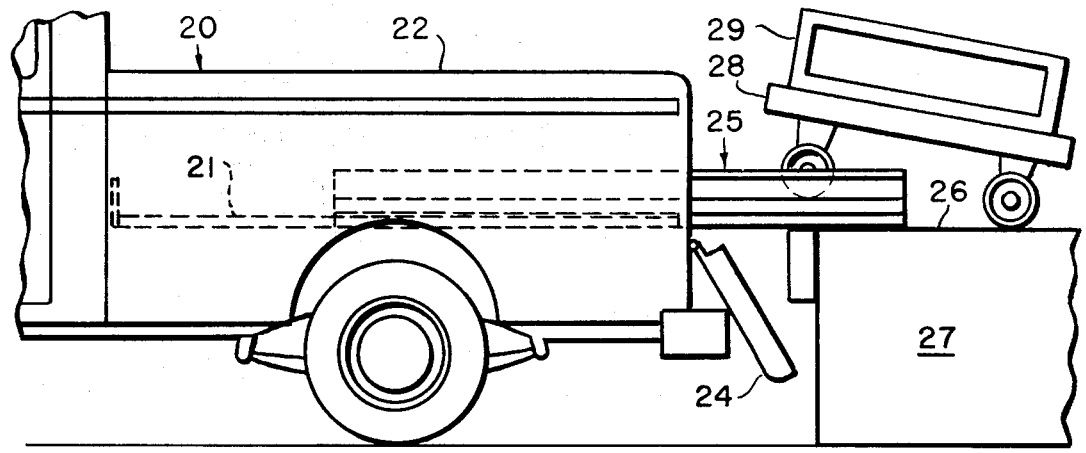
FIG. 1 is a side elevation showing the load-transfer device forming a bridge over to a loading dock.
Figure 2:
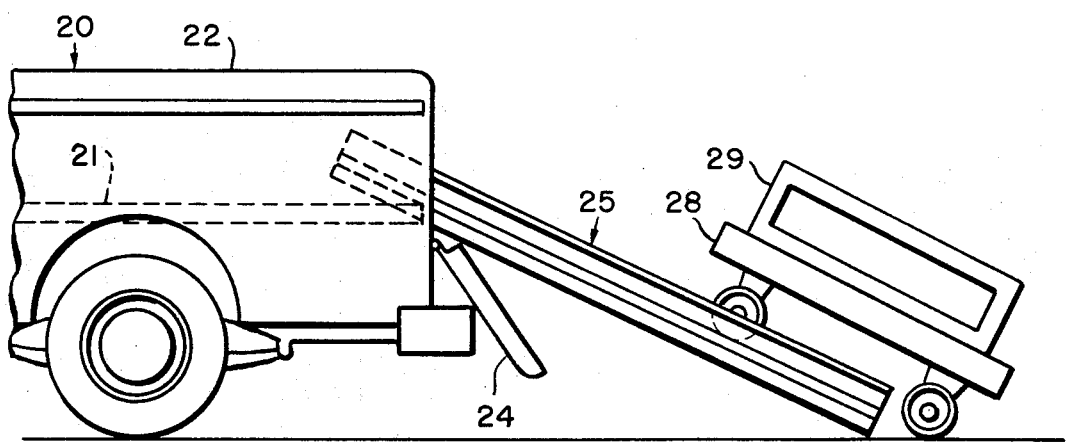
FIG. 2 is a side elevation illustrating the use of the load-transfer mechanism to form a loading ramp.
Figure 3:
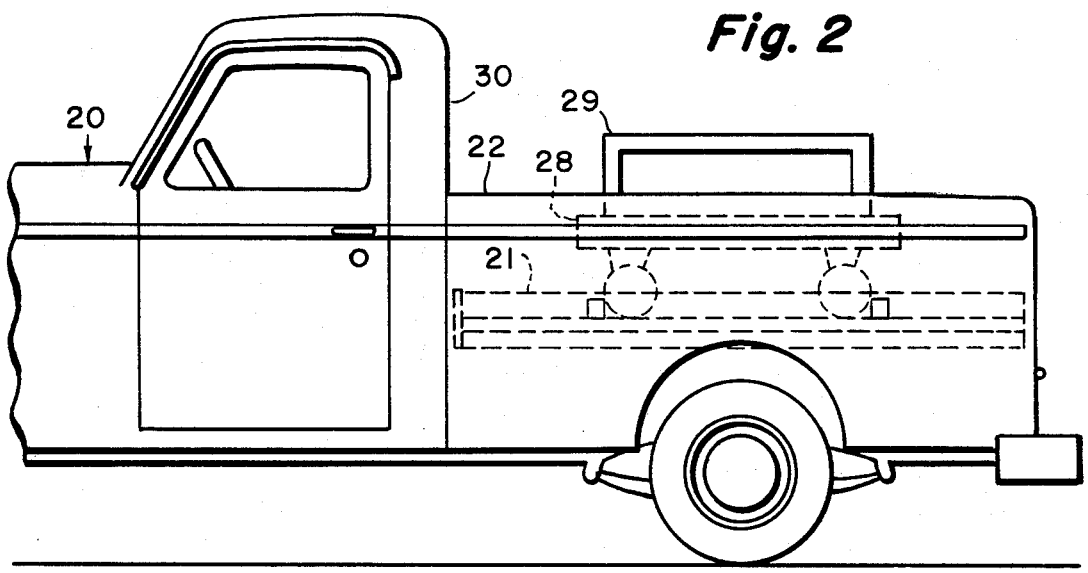
FIG. 3 illustrates the final position of the load and the transfer platform over the floor of the truck.

The vehicle appearing in FIGS. 1 to 3 is indicated generally at 20, and is of a type commonly referred to as a "pick-up truck." A load-receiving floor at the rear is bounded on opposite sides by the wall structures 22 and 23, and at the rear by the tailgate 24 that swings down to the position shown in FIG. 1 to a position below the level of the floor 21. The load-transfer platform assembly 25 is shown in FIG. 1 as forming a bridge from the floor 21 of the vehicle over to the surface 26 of the freight dock 27. The freight dolly 28 is shown carrying a load 29, and is movable from the dock to the truck, and vice versa, via the extendable transfer platform assembly 25. FIG. 2 illustrates the use of the platform assembly 25 as a ramp along which the dolly 28 can be moved either on or off the truck directly to ground level. FIG. 3 shows the final position of the dolly directly over the load-floor 21, with the transfer platform assembly within the space between the back of the cab 30 and the closed tailgate 24. In moving from the FIG. 2 to the FIG. 3 position, the dolly 28 is pushed either manually, or with the assistance of a winch, up to the point where the platform can be lifted from its rear end into a horizontal position preparatory to retraction into the truck.

Figure 4:
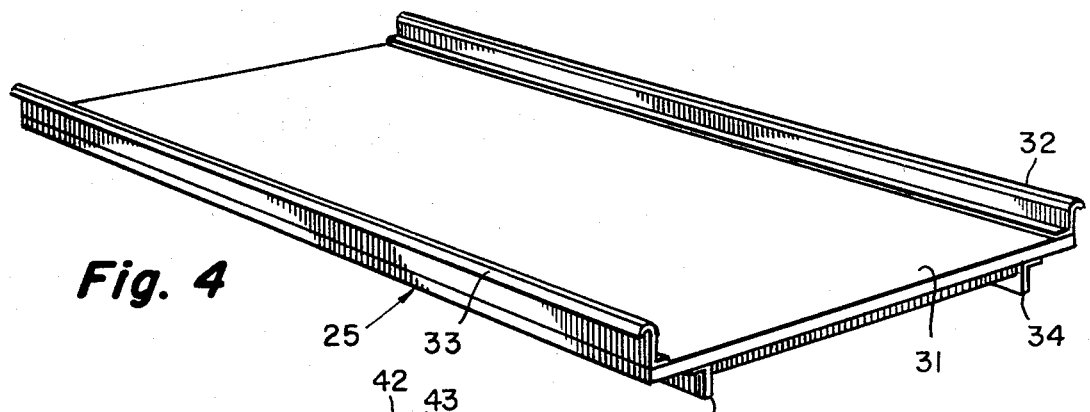
FIG. 4 is a perspective view from above of the shiftable load-transfer platform assembly.
Figure 5:
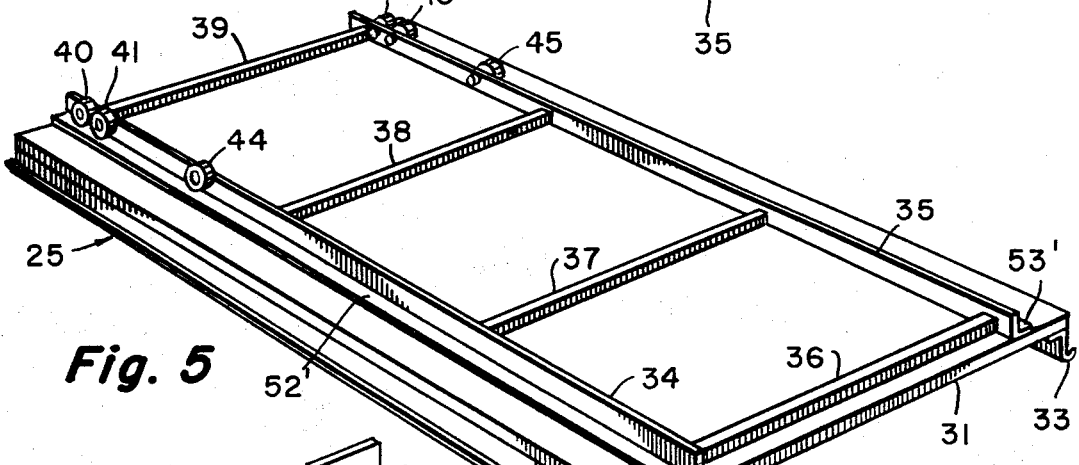
FIG. 5 is a perspective view of the underside of the structure shown in FIG. 4.
Figure 6:
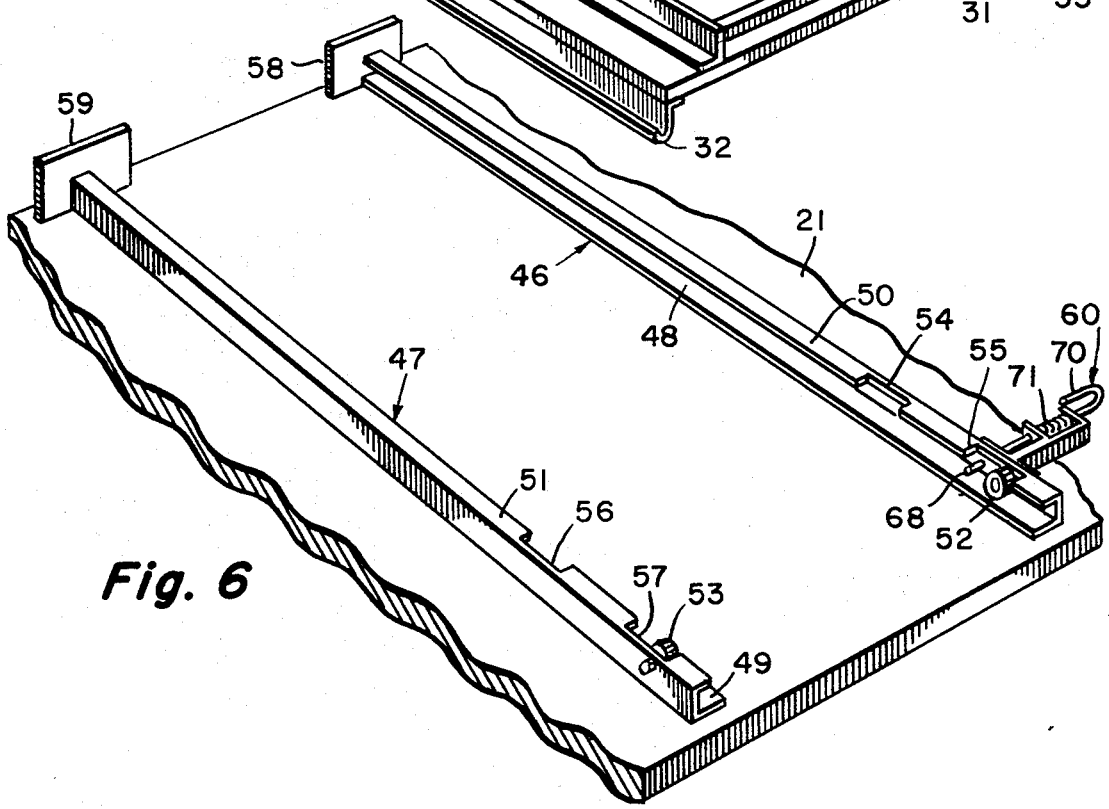
FIG. 6 is a perspective view showing the rail installation on the floor of the truck for accomodating the shiftable load carrier.
Figure 13:
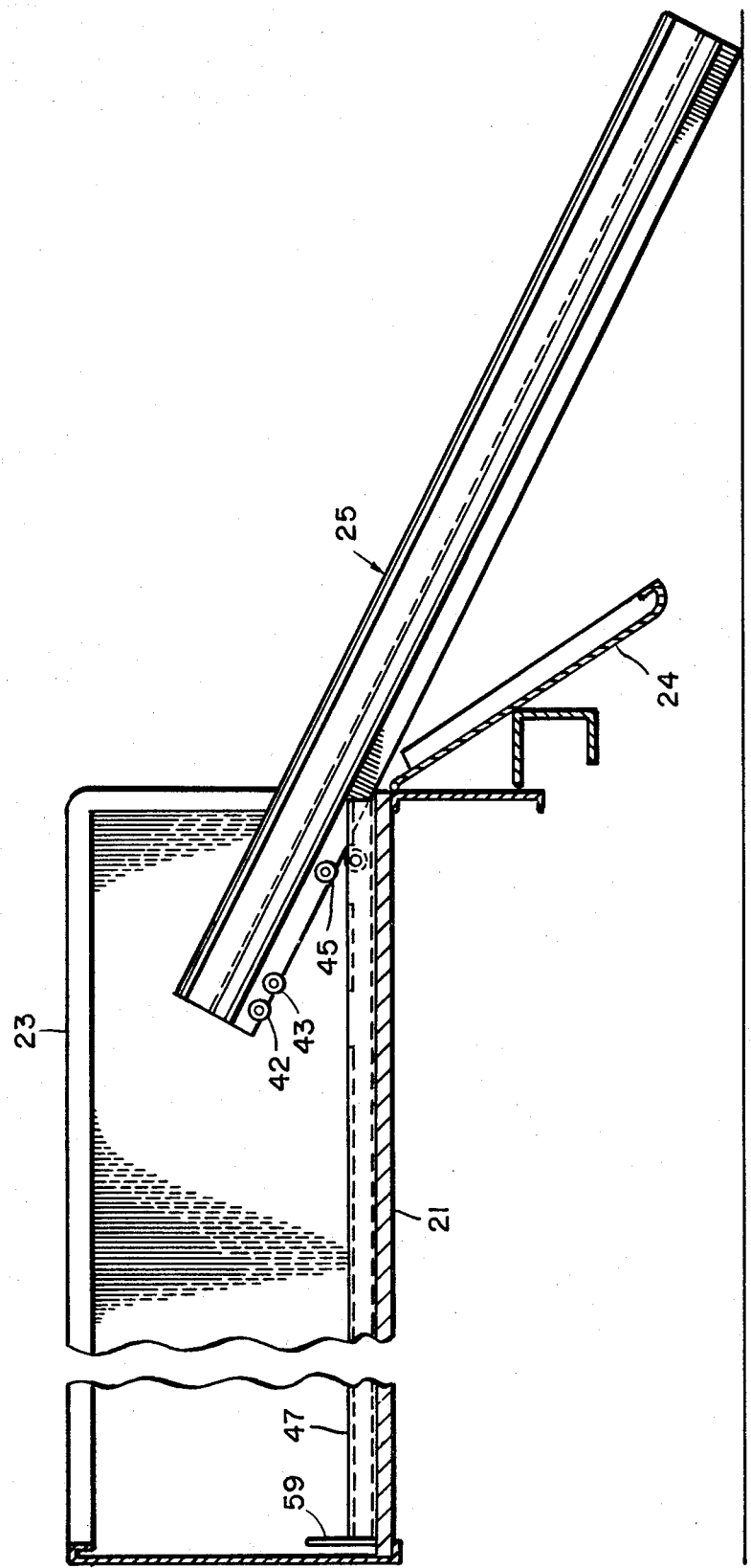
FIG. 13 is a section in side elevation showing the relationship of the load-transfer platform arranged as a loading ramp.
Figure 14:
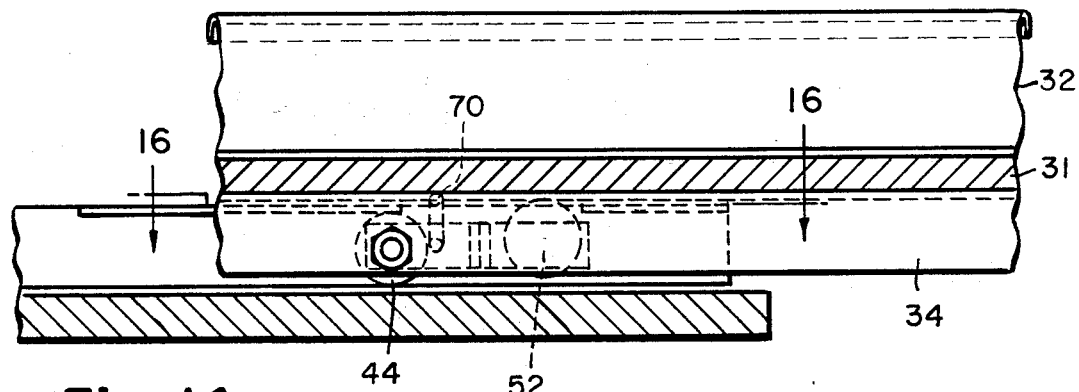
FIG. 14 is a section on a plane 14—14 of FIG. 9, on an enlarged scale, showing the locking mechanism in the locked position.
Figure 15:
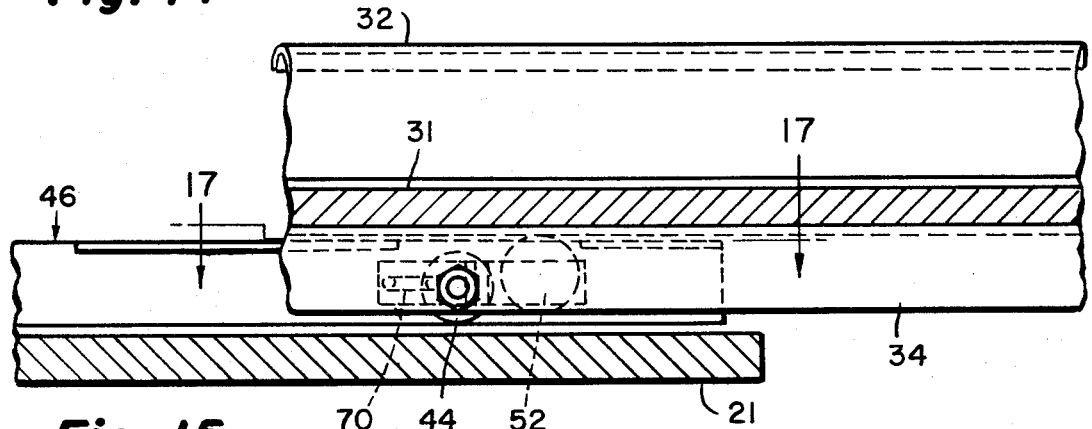
FIG. 15 is a section similar to FIG. 14, illustrating the locking mechanism in the unlocked position.

Referring to FIGS. 4 through 6, the platform assembly includes the panel 31 provided with the side strips 32 and 33, which would normally be rolled sections of steel. These function primarily to maintain the load placed upon the top surface of the panel 31 in a spaced relationship with respect to the side walls 32 and 33 of the truck. The beams 34 and 35 are preferably in the form of rolled steel angles, and are interconnected by the transverse members 36-39 to form a stiffening frame work underneath the panel 31. The load-carrying rollers 40-41 and 42-43 are rotatably mounted on conventional studs secured respectively to the beams 34 and 35. The retaining rollers 44 and 45 are also mounted on conventional studs secured to the beams 34 and 35, respectively, and are installed on an axis so that a horizontal tangent to the normally upper surface of the rollers (FIG. 5 being the inverted position of the assembly) is slightly above a horizontal tangent to the tops of the load-carrying rollers.

The rails 46 and 47 are secured to the floor 21 of the truck in a front-to-rear direction by any convenient means, such as bolts or by welding. These rails are channel-shaped in configuration, and are installed with the open side of the rails facing inwardly toward the center of the truck. The rollers 40-41 engage the lower flange 48 of the rail 46, and the rollers 42-43 engage the lower flange 49 of the rail 47. The rollers 44 and 45 engage the underside of the upper flanges 50 and 51 of the rails 46 and 47, respectively, to retain in the platform assembly against a tendency to move upwardly. The rollers 52 and 53 are rotatably mounted on studs secured respectively to the rails 46 and 47, and these bear against the underside of the horizontal flanges 52' and 53' of the frame beams 34 and 35. As the platform assembly moves toward the position shown in FIG. 1, the interaction of the rollers 44-45 and 52-53 provides a cantilever support until some form of auxiliary support is provided by a freight dock or by some auxiliary structure. The flanges 50 and 51 are interrupted as shown at 54-55 and 56-57. These interruptions provide for the escape of the rollers 40-45 as the platform assembly is moved to its extreme position in a rearward direction.

FIGS. 10 through 12 illustrate the various positions in which the platform assembly can be placed during loading and unloading. FIG. 10 corresponds to the fully loaded or unloaded position, with the platform assembly directly over the load floor 21 of the truck. To protect the rear structure of the cab 30, it is preferable to install barrier plates as shown on 58 and 59 in FIG. 6 as a stop to limit the forward movement of the platform assembly. When the tailgate 24 is lowered to the FIG. 1 position, the platform assembly can be rolled out as shown in FIG. 11. Prior to the time in which the load passes directly above the rear rollers 52 and 53, the total load on the platform is supported by the combined effect of the rollers 52-53 and the rollers 40-43. As the load passes over center with respect to the rollers 52 and 53, the action changes somewhat to a combination of vertical support provided by the rollers 52 and 53 and downward pressure on the rollers 44 and 45. As the platform assembly moves to the extremity of its freedom of movement to the rear, a point is reached at which the rollers 40-43 become opposite the interruptions 54 and 56, and the rollers 44 and 45 opposite the interruptions 55 and 57. At this time, the platform assembly can be lifted completely out of engagement with the rails 46 and 47 so that it can accomodate a loading dock level higher than the position of the platform assembly on the truck, or inclined downwardly to the FIG. 2 position to function as an inclined ramp from ground level.

Figures 16, 17:
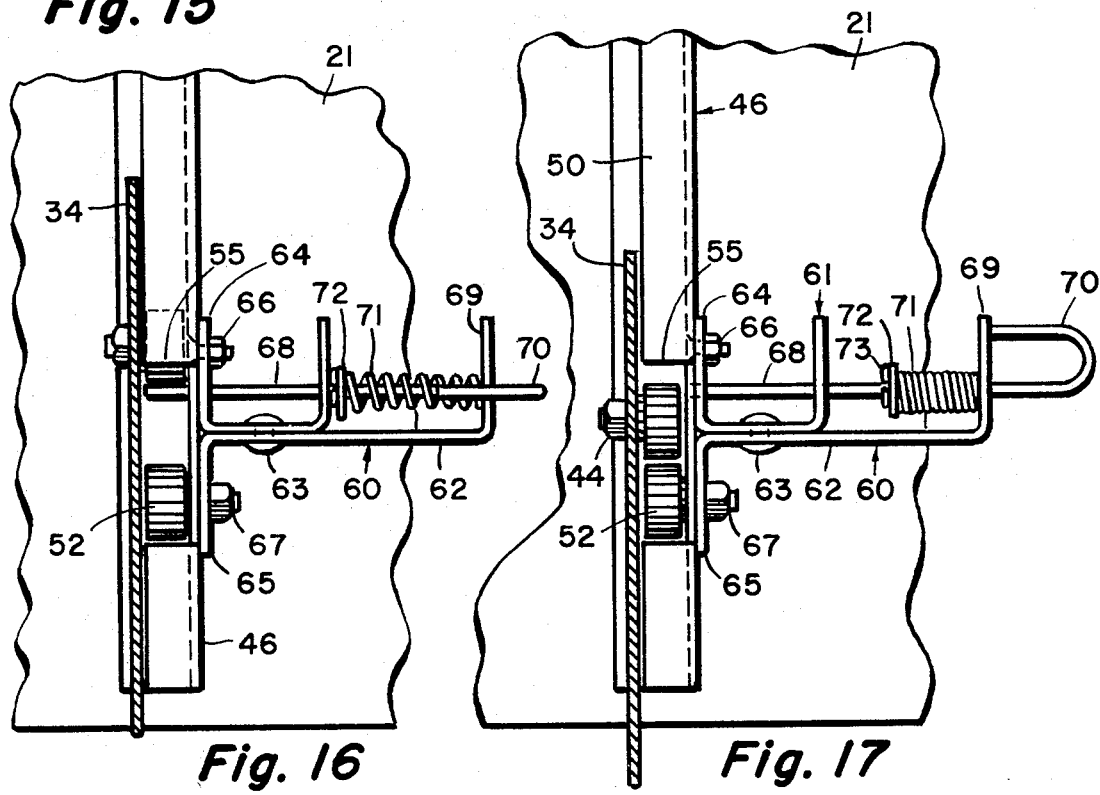
FIG. 16 is a section on the plane 16—16 of FIG. 14.
FIG. 17 is a section on the plane 17—17 of FIG. 15.

A latch mechanism shown best in FIGS. 16 and 17 is provided to block the movement of the platform assembly to the FIG. 12 position, until the operator intends to have this occur. A bracket assembly generally indicated at 60 is secured to the outside of the rail 46. This assembly includes the U-shaped component 61, and the Z-shaped component 62. These are secured together in the relationship shown in FIGS. 16 and 17 by the rivet 63. The leg 64 of the component 61 and the leg 65 of the component 62 form oppositely-extending flanges that are secured to the vertical back of the rail 46 by bolts and nuts as shown at 66 and 67. The stud shaft for the roller 52 may double for this purpose, as shown in these figures.

A rod 68 forms a plunger, and is slidably received within aligned aperatures in the "U" component 61 and the side wall of the rail 46. The inner extremity of this rod is movable into a position forming a barrier to the rearward movement of the platform assembly by intercepting the roller 44. This position is shown in FIG. 6. The rod 68 continues through an aligned aperature in the outer flange 69 of the bracket assembly 60, beyond which it is formed into the return bend 70. The rod 68 is rotatable about its own axis between positions in which the return bend 70 can overhang the flange 69 (as shown in FIG. 16), and one in which the extreme end of the return bend can abut against the flange 69. This latter position is possible only by a withdrawal of the rod 68 to the right, as shown in FIGS. 16 and 17, against the action of the compression spring 71. This spring acts between the flange 69 and the washer 72 fixed axially with respect to the rod 68 by the pin 73. In the FIG. 17 position of the assembly, the inward end of the rod 68 is withdrawn beyond the position in which it can intercept the roller 44. The pin 73 can function as a stop to the inward movement of the rod 68, as shown in FIG. 16, when the pin abuts against the "U" component 61.

We claim:

1. In combination with a truck having a load-receiving floor and a tailgate normally forming a barrier at the rear of said floor, a loading-unloading mechanism including spaced parallel rails normally secured to said floor, a platform assembly, and roller means operative to transfer the weight of said platform assembly and the load carried thereby to said rails, said rails having a retaining flange normally over-hanging a portion of said platform assembly along the path of movement thereof determined by said rails, wherein the improvement comprises:

mounting means securing certain of said roller means to said platform assembly adjacent one end thereof in a position disposed to normally bear downwardly on a portion of said rails, said platform assembly portion being adjacent said certain roller means;

said rails having at least one interruption in the retaining flanges thereof providing clearance for the upward escape of said certain roller means and platform assembly portion exclusively when said platform assembly is extended substantially beyond the ends of said rails; and latch means operative to block the movement of said platform in a direction to move said certain roller means and platform assembly portion toward said interruption, said latch means including bracket means secured to said one rail, and a plunger slidably traversing at least one portion of said bracket means and one of said rails on a substantially horizontal axis, said rod having a return bend at the outer extremity thereof adapted to over hang said bracket portion in certain angular positions of said rod about the axis thereof, and engage said bracket portion in other angular positions of said rod about said axis exclusively with said rod in a position axially withdrawn from blocking position, and further including biasing means normally urging said plunger to blocking position.

2. In combination with a truck, a loading-un-loading mechanism including spaced parallel rails normally secured to said truck, a platform assembly, and roller means operative to transfer the weight of said platform assembly and the load carried thereby to said rails, said rails having a retaining flange normally over-hanging a portion of said platform assembly along the path of movement thereof determined by said rails, wherein the improvement comprises:

mounting means securing certain of said roller means to said platform assembly adjacent one end thereof in a position disposed to normally bear downwardly on a portion of said rails, said platform assembly portion being adjacent said certain roller means;

said rails having at least one interruption in the retaining flanges thereof providing clearance for the upward escape of said certain roller means and platform assembly portion, exclusively when said platform assembly is extended substantially beyond the ends of said rails;

latch means operative to block the movement of said platform in a direction to move said certain roller means and platform assembly portion toward said interruption, said latch means including bracket means secured to said one rail, and a plunger slidably traversing at least one portion of said bracket means and one of said rails on a substantially horizontal axis, said rod having a return bend at the outer extremity thereof adapted to over hang said bracket portion in certain angular positions of said rod about the axis thereof, and engage said bracket portion in other angular positions of said rod about said axis exclusively with said rod in a position axially withdrawn from blocking position and further including biasing means normally urging said plunger to blocking position.

* * * * *